United States Patent [19]

Bresnahan

[11] Patent Number: 4,773,747

[45] Date of Patent: Sep. 27, 1988

[54] FOLDABLE BINOCULAR AND BLANK THEREFOR

[75] Inventor: William M. Bresnahan, Bensalem, Pa.

[73] Assignee: Innovational Products Co., Inc., Bensalem, Pa.

[21] Appl. No.: 848,990

[22] Filed: Apr. 7, 1986

[51] Int. Cl.[4] .................. G02B 23/18; G02B 23/20
[52] U.S. Cl. ............................... 350/546; 350/250
[58] Field of Search ............... 350/140, 145, 250, 546, 350/581; 40/365; 352/239; 229/41 R, 41 B, 41 D

[56] References Cited

U.S. PATENT DOCUMENTS

| | | | |
|---|---|---|---|
| 393,899 | 12/1888 | Haines | 229/41 B |
| 3,550,837 | 12/1970 | Erb | 229/45 R |
| 4,013,341 | 3/1977 | Riley | 350/145 |
| 4,239,328 | 12/1980 | Justice, Sr. et al. | 350/546 |
| 4,268,111 | 5/1981 | Green et al. | 350/546 |
| 4,443,071 | 4/1984 | Ueda | 350/546 |
| 4,478,498 | 10/1984 | Ohno | 350/546 |
| 4,486,079 | 12/1984 | Ueda | 350/546 |

FOREIGN PATENT DOCUMENTS 884432 10/1971 Canada ..................... 350/250

OTHER PUBLICATIONS

WO85/01121, "Folding Optical Devices Such as Binoculars", 3—85.
Holross Limited, Canada; Holross, Inc. U.S.A.; Magna View Binoculars brochure, Jun. 1984, 6 pp.

Primary Examiner—William H. Punter
Attorney, Agent, or Firm—Florence U. Reynolds

[57] ABSTRACT

A one-piece blank of thin semi-rigid material, such as cardboard, formed into a series of rectangular panels hingedly connected at parallel foldlines and two trapezoidal pairs of interlocking flaps, may be easily assembled to form a foldable binocular. One panel contains a pair of objective lenses and another panel contains a pair of ocular lenses. When folded, the objective lenses, and optionally the ocular lenses, are protected from scratches and smudges by a pair of rectangular flaps formed by glueing certain panels together before assembly.

8 Claims, 4 Drawing Sheets

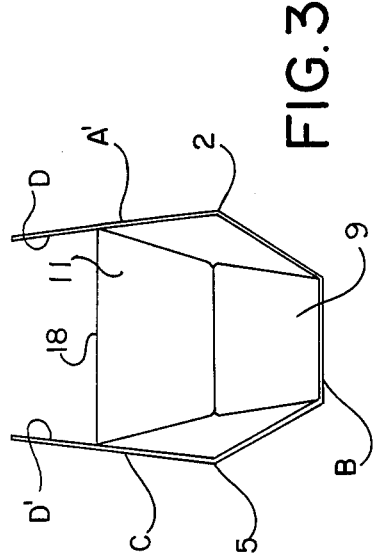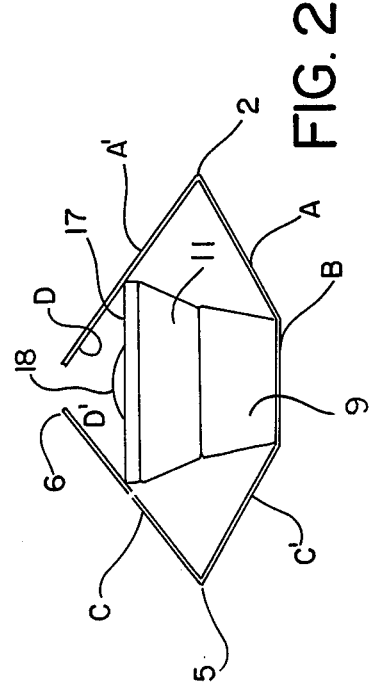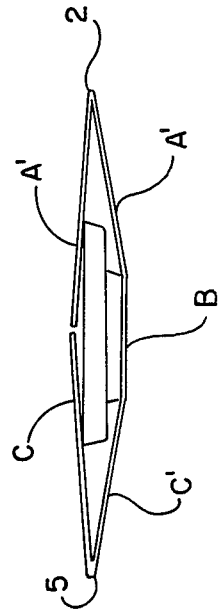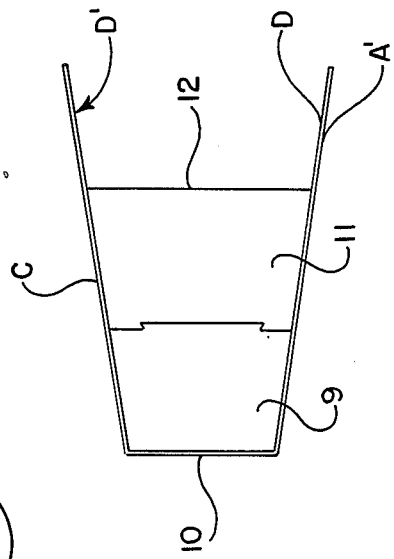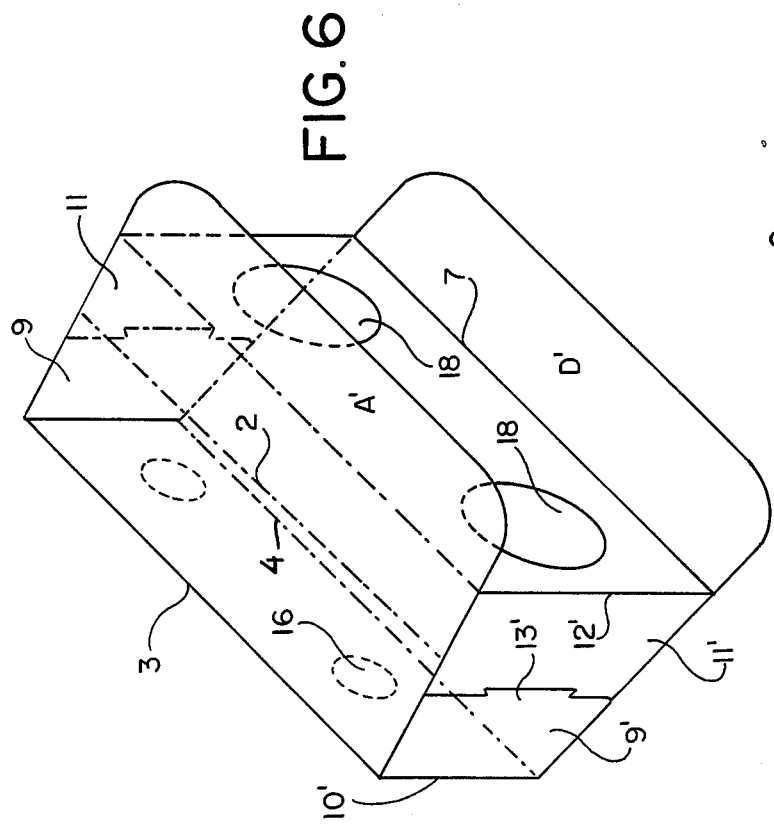

FOLDABLE BINOCULAR AND BLANK THEREFOR

BACKGROUND OF THE INVENTION

The invention relates to a foldable binocular and the blank for forming the binocular.

Several binoculars of this type are known in the prior art and are made of a relatively thin semi-rigid material, such as cardboard. When folded, they are light in weight and compact and suited for taking to sporting events, concerts etc.

One disadvantage of some of the prior art binoculars of this type is that, when folded, the lenses, especialy the larger convex objective lenses, are unprotected and may be scratched when carried in pocket or purse. This disadvantage is overcome in U.S. Pat. Nos. 4,239,328 and 4,478,498 by providing a cardboard sleeve or case in which to store the folded binocular when not in use. However, this solution is not entirely satisfactory since the case must be stored when the binocular is being used.

In U.S. Pat. No. 4,013,341, the lens elements of the binocular are retracted before folding in order to protect them from scratching. However, they must be pulled out by tabs when the binocular is unfolded. This is awkward.

In U.S. Pat. No. 4,443,071, the lenses fold inwardly when the binocular is in a folded state and thus are protected. However, the arrangement is such that, when the binocular is to be used, the various side flaps must be folded individually to reassemble the binocular as one would assemble a box. Then the flaps must be unfolded in order to disassemble the binocular. This is very inconvenient. Several of the fold lines must be folded in reverse during assembly and disassembly, thus weakening the cardboard material.

It is an object of the invention to provide a foldable binocular wherein the lenses are protected when the binocular is in the folded state.

It is a further object to provide a foldable binocular which may be partly disassembled to obtain access to the inner surfaces of the lenses for cleaning, if necessary.

SUMMARY OF THE INVENTION

The Invention relates to a blank for a foldable binocular and the binocular formed therefrom. The blank comprises a substantially rectangular sheet of relatively thin semi-rigid material divided by parallel foldlines into a series of rectangular panels comprising a first rectangular panel having an intermediate outwardly folding foldline parallel to its longitudinal axis; a second rectangular panel hingedly attached to the first rectangular panel along an outwardly folding foldline, and having a pair of spaced apertures for receiving a pair of ocular lenses and having a trapezoidal flap hingedly attached to each of its short sides along an outwardly folding foldline; a third rectangular panel hingedly attached to the second rectangular panel along an outwardly folding foldline and having an intermediate outwardly folding foldline parallel to its longitudinal axis; and a fourth rectangular panel hingedly attached to said third rectangular panel along an outwardly folding foldline and having a pair of inwardly folding foldlines defining a central rectangular panel having a second pair of spaced apertures for receiving a pair of objective lenses and a trapezoidal flap hingedly attached to each short side of the central rectangular panel along an outwardly folding foldline; wherein the outer ends of the trapezoidal flaps on the second rectangular panel are capable of interlocking with the outer ends of the trapezoidal flaps on the fourth rectangular panel.

The ocular and objective lenses are preferably attached to the blank by way of lens plates attached to the inner surface of the second rectangular panel and the central rectangular panel, respectively.

Since the objective lenses are convex, it is important to protect them from scratching during storage. This is achieved during assembly of the binocular by gluing portions of the fourth rectangular panel to the first and third rectangular panels, respectively, to form a pair of rectangular flaps. These flaps cover the objective lenses when the binocular is folded. However, the concave ocular lenses may also be protected in a similar manner by an additional pair of rectangular flaps which cover the ocular lenses when the binocular is in folded position. These flaps are formed by constructing the blank in such a way that there is an additional panel on each side of the ocular lens panel and which may be folded in half to form a rectangular flap.

The interlocking trapezoidal side flaps may be opened to provide access to the inner surfaces of the lenses for cleaning, if necessary. It is also desirable to attach a two-part mating fastening means to the center of the inner surfaces of the lens plates, one part on one plate and a mating part on the other plate, so that the folded binocular may be held securely in the folded position when not in use. Such a fastening means may be a two-part snap or patches of VELCRO ® fabric.

BRIEF DESCRIPTION OF THE DRAWINGS

FIG. 2 is a side elevation view of the binocular assembled from the blank of FIG. 1, in mid-extension, resting on the ocular lens panel.

FIG. 3 is a side elevation view of the assembled binocular in a more extended position than in FIG. 2.

FIG. 4 is a side elevation view of the assembled binocluar of FIG. 2 in fully extended viewing position.

FIG. 5 is a side elevation view of the assembled binocular of FIG. 2 in folded position resting on the ocular lens panel.

FIG. 6 is a perspective view of the assembled binocular of FIG. 2.

DETAILED DESCRIPTION

Figure 1:
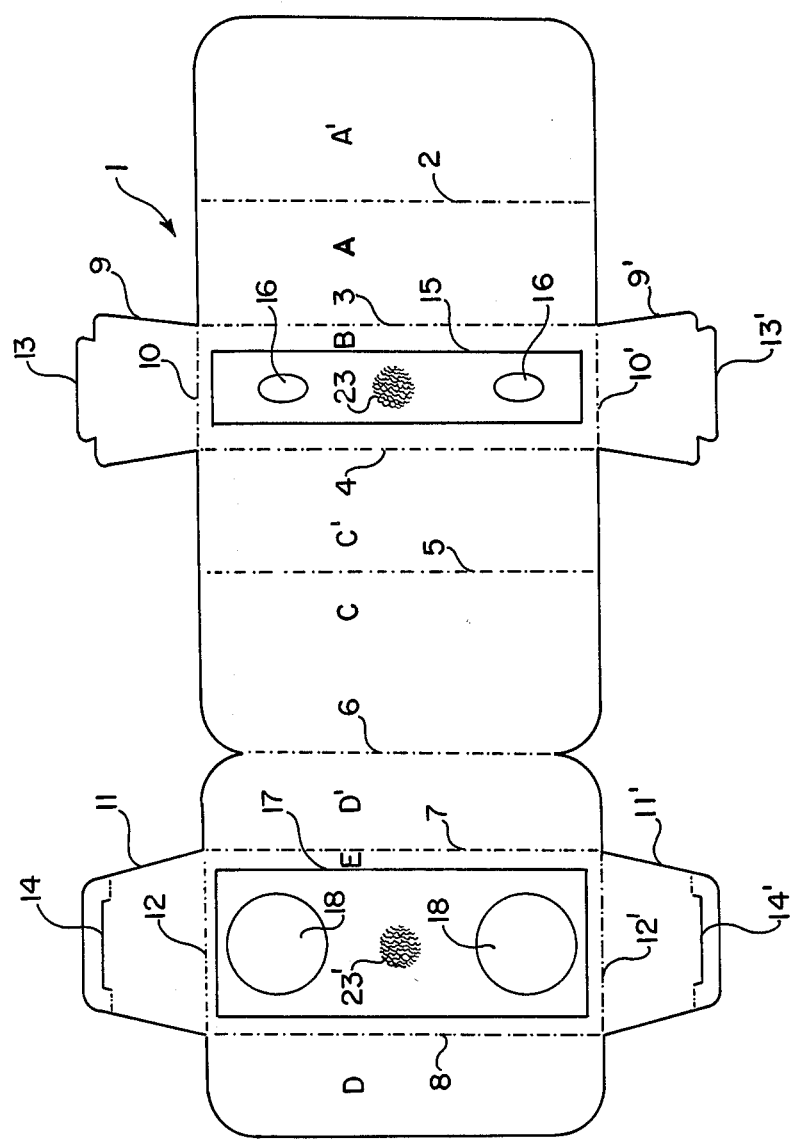
FIG. 1 is an inner plan view of one embodiment of the binocular blank according to the invention.

In FIG. 1, the binocular blank 1 is divided into a series of rectangular panels A-A', B, C-C', D-D', by parallel foldlines 3, 4,6 which are outwardly folding. Panels A-A', C-C' are further divided by outwardly folding foldlines 2 and 5, respectively. Panel D-D' is divided by inwardly folding foldlines 7,8 to define a panel E. Trapezoidal tabs 9,9' are hingedly attached at outwardly folding foldlines 10,10' to the short sides of panel B and trapezoidal tabs 11,11' are hingedly attached at outwardly folding foldlines 12,12' to the short sides of panel E. Ears 13,13' on tabs 9,9' can interlock with tabs 11,11' by insertion into slits 14,14', respectively. A lens plate 15 holding a pair of ocular lenses 16 is attached to the inner surface of panel B with the lenses aligned over a pair of apertures (not shown) in panel B. A lens plate 17 holding a pair of objective lenses 18 is attached to the inner surface of panel E with the lenses aligned over a pair of apertures (not shown) in panel E.

To assemble the binocular, the blank is folded along foldlines 2–8, the inner surface of section D of panel D–D' is glued to the inner surface of section A' of panel A–A' and section D' of panel D–D' is glued to the inner surface of section C of panel C–C'. Tabs 9,9' are interlocked with tabs 11,11', respectively, by inserting ears 13,13' into slits 14,14', respectively. The side elevation view of the assembled binocular is shown in FIG. 2 in midextension. FIG. 3 shows a more extended view obtained by exerting pressure on foldlines 2 and 5. The fully extended position is shown in FIG. 4. By exerting pressure on flap sections D–D' and panel B, the binocular may be flattened for storage. As can be seen, the objective lenses are fully protected by flaps A' and C when the binocular is folded. Fastening means comprising patches of VELCRO ® fabric 23,23' are adhered to lens plates 15 and 17 in order to keep the binocular securely closed in the folded position. A perspective view of the fully extended binocular ready for use is shown in FIG. 6 with phantom lines to show the inner construction.

Figure 7:
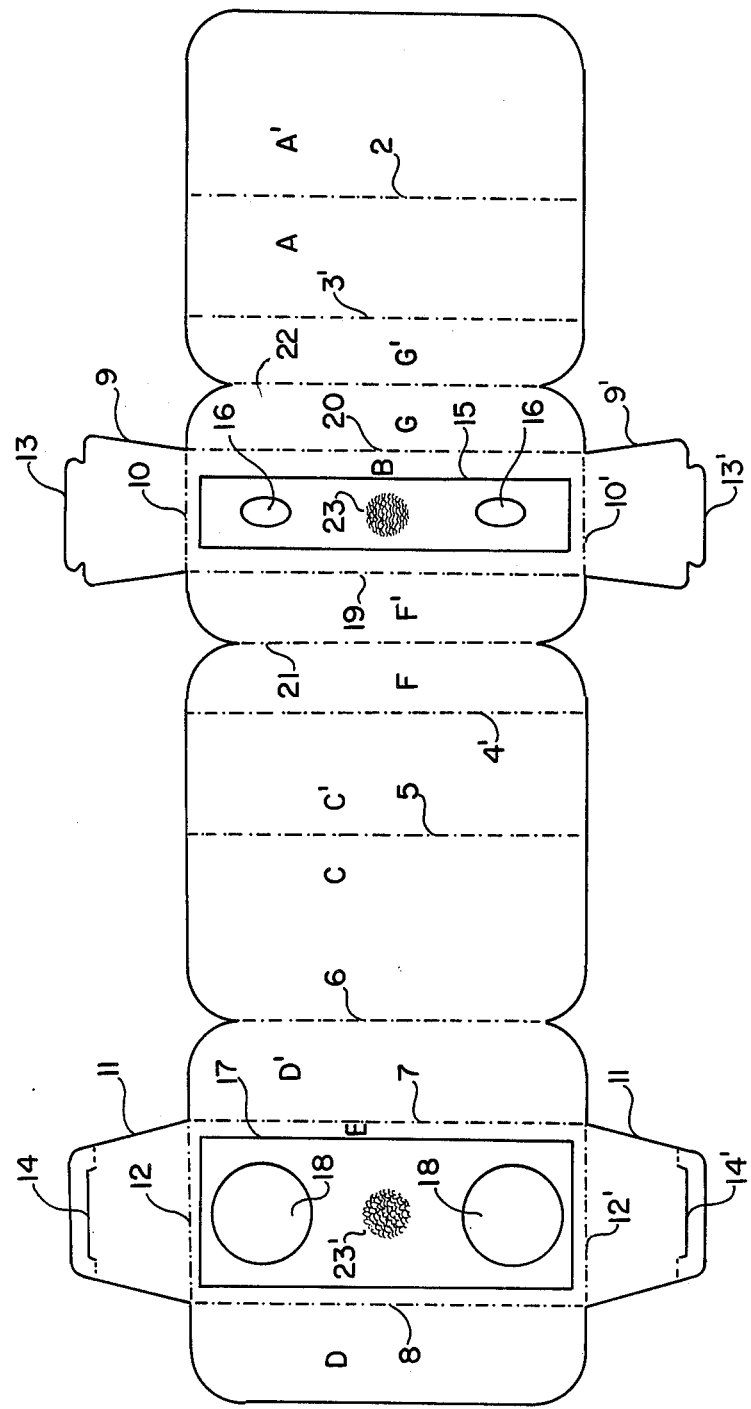
FIG. 7 is an inner plan view of another embodiment of the binocular blank according to the invention.

A second embodiment of the invention is shown in FIG. 7 which essentially shows the blank of FIG. 1 containing two additional rectangular panel portions F–F' and G–G' on either side of panel B which contains the ocular lenses 16. Panel portion F–F' has an intermediate outwardly folding foldline 21 and panel portion G–G' has an intermediate outwardly folding foldline 22. Panel portion F–F' is hingedly connected to panel B at inwardly folding foldline 19 and panel portion G–G' is hingedly connected to panel B at inwardly folding foldline 20.

The assembly of the binocular from the blank of FIG. 7 is the same as for the blank of FIG. 1 except that the inner surfaces of panel portion segments F and F' are glued together and the inner surfaces of panel portion segments G and G' are glued together. This forms two rectangular flaps which fold over the objective lenses when the binocular is folded flat. Due to the presence of these flaps, the foldlines adjacent panel B, namely foldlines 21' and 22' are now inwardly folding rather than outwardly folding (foldlines 3 and 4) as in FIG. 1. The protruding corners of panels A', D,D', C, and panel portion segments F, F', G and G' are rounded so as to form more comfortable edges when handled or placed near the eyes.

Figure 9:
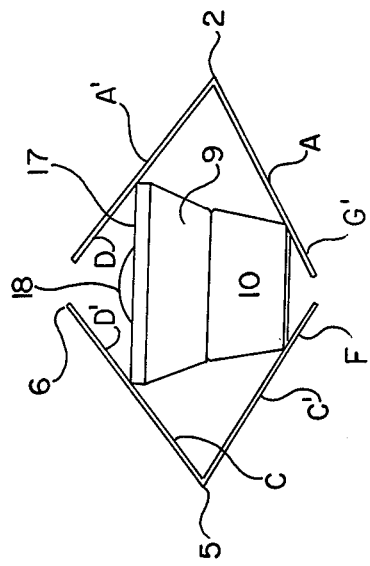
FIG. 9 is a side elevation view of the binocular assembled from the blank of FIG. 7 in mid-extension.
Figure 10:
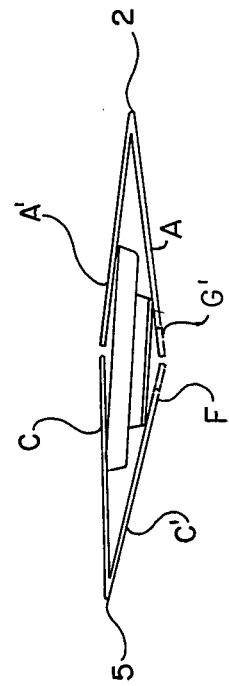
FIG. 10 is a side elevation view of the assembled binocular of FIG. 9 in folded position.
Figure 8:
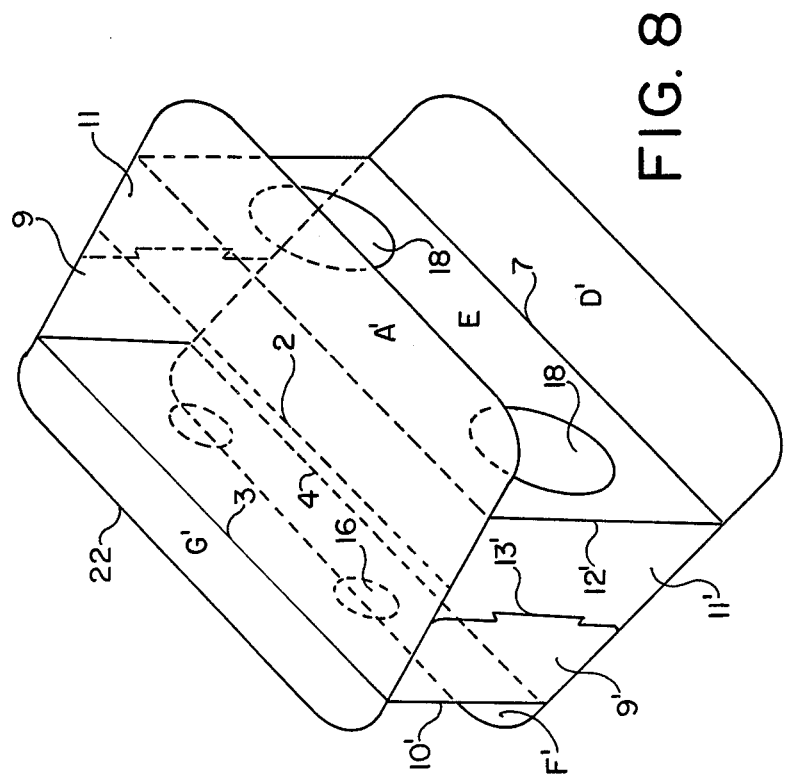
FIG. 8 is a perspective view of the binocular assembled from the blank of FIG. 7.

FIG. 8 is a perspective view of the fully extended binocular assembled from the blank of FIG. 7. A side elevation view of the assembled binocular of FIG. 8 in mid-extension is shown in FIG. 9. FIG. 10 is a side elevation view of the assembled binocular of FIG. 8 in folded position.

It is to be understood that various modifications of the above described embodiments may be made without departing from the essence of the invention as defined by the appended claims.

I claim:

1. A blank for a foldable binocular comprising a substantially rectangular sheet of relatively thin semi-rigid material divided by parallel foldlines into a series of rectangular panels comprising a first rectangular panel having a first outwardly folding foldline parallel to its longitudinal axis;

a second rectangular panel hingedly attached to said first rectangular panel along a second outwardly folding foldline, said rectangular panel having a first pair of spaced apertures for receiving a pair of ocular lenses and having a trapezoidal flap hingedly attached to each of its short sides along third and fourth outwardly folding foldlines, respectively;

a third rectangular panel hingedly attached to said second rectangular panel along a fifth outwardly folding foldline and having an intermediate sixth outwardly folding foldline parallel to its longitudinal axis; and a fourth rectangular panel hingedly attached to said third rectangular panel along a seventh outwardly folding foldline and having first and second inwardly folding foldlines defining a central rectangular panel having a second pair of spaced apertures for receiving a pair of objective lenses and a second trapezoidal flap hingedly attached to each short side of said central rectangular panel along eighth and ninth outwardly folding foldlines, respectively;

wherein the outer end of each of said first trapezoidal flaps on said second rectangular panel is capable of interlocking with the outer end of each second trapezoidal flap on said fourth rectangular panel.

2. The blank according to claim 1, further comprising a first lens plate bearing said pair of ocular lenses and attached to the inner surface of said second rectangular panel so that said ocular lenses are aligned with said first pair of apertures and a second lens plate bearing said pair of objective lenses and attached to the inner surface of said central rectangular panel so that said objective lenses are aligned with said second pair of apertures.

3. A foldable binocular formed from the blank of claim 2 by folding said blank along the respective foldlines, gluing the inner surfaces of said fourth rectangular panel on either side of said central rectangular panel to said first rectangular panel and to said third rectangular panel, respectively, thereby forming a pair of rectangular flaps on either side of said central rectangular panel, and interlocking said pairs of first and second trapezoidal flaps, whereby said rectangular flaps cover and protect said objective lenses when the binocular is folded.

4. The blank according to claim 1, further comprising first and second rectangular panel portions hingedly attached on either longitudinal side of said second rectangular panel along third and fourth inwardly folding foldlines, respectively, said first and second rectangular panel portions being hingedly attached to said first and third rectangular panels along said second and fifth outwardly folding foldlines, respectively, said first rectangular panel portion having a tenth outwardly folding foldline intermediate said second outwardly folding foldline and said third inwardly folding foldline, and said second rectangular panel portion having an eleventh outwardly folding foldline intermediate said fifth outwardly folding foldline and said fourth inwardly folding foldline, said tenth and eleventh outwardly folding foldlines being parallel to the longitudinal axis of said second rectangular panel.

5. The blank according to claim 4, further comprising a first lens plate bearing said pair of ocular lenses and attached to the inner surface of said second rectangular panel so that said ocular lenses are aligned with said first pair of apertures and a second lens plate bearing said pair of objective lenses and attached to the inner surface of said central rectangular panel so that said objective lenses are aligned with said second pair of apertures.

6. A foldable binocular formed from the blank of claim 5, by folding said blank along the respective foldlines, gluing the inner surfaces of said fourth rectangular panel on either side of said central rectangular panel to said first rectangular panel and to said third rectangular panel, respectively, thereby forming a first pair of rectangular flaps on either side of said central rectangular panel; gluing the inner surfaces of said first and said second rectangular panel portions on either side of their respective intermediate foldlines, thereby forming a second pair of rectangular flaps on either side of said second rectangular panel; and interlocking said pairs of first and second trapezoidal flaps, whereby said first and second pairs of rectangular flaps cover and protect said objective lenses and said ocular lenses, respectively, when the binocular is folded.

7. The foldable binocular according to claim 3, further comprising mating fastening means attached to the inner surfaces of said lens plates.

8. The foldable binocular according to claim 6, further comprising mating fastening means attached to the inner surfaces of said lens plates.

* * * * *